June 15, 1943.  J. H. ROBERTSON  2,321,940
HEATING SYSTEM
Filed July 15, 1941
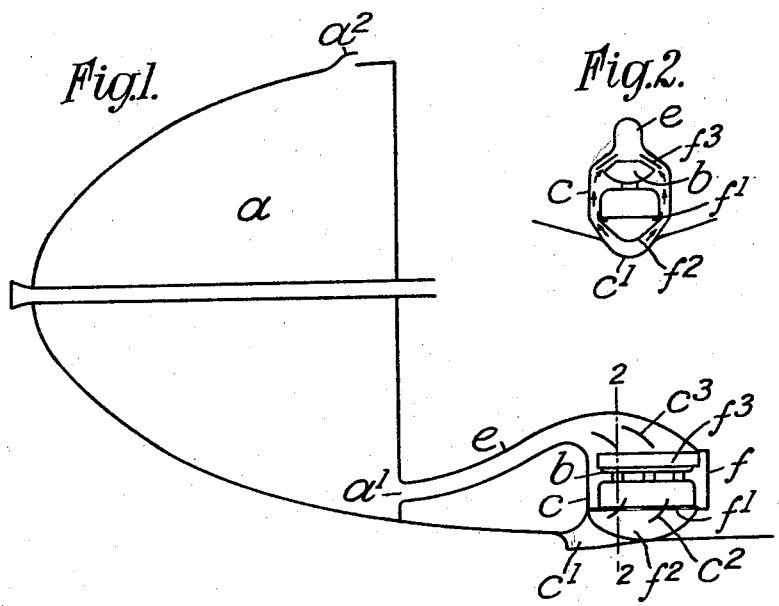
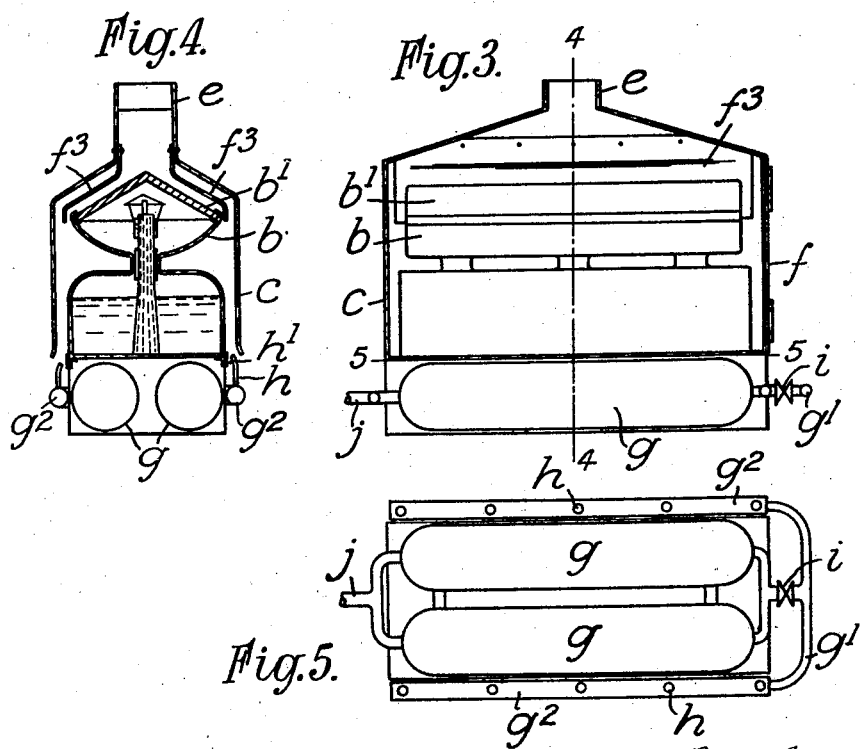
Inventor
John Hogg Robertson
Geo. C. Shoemaker ATTY.

Patented June 15, 1943

2,321,940

UNITED STATES PATENT OFFICE 2,321,940

HEATING SYSTEM

John Hogg Robertson, London, England

Application July 15, 1941, Serial No. 402,519
In Great Britain December 9, 1940

4 Claims. (Cl. 237—32)

This invention relates to heating systems for use in aircraft, automobiles, railroad cars and other vehicles requiring safe and reliable heating; the improved system is particularly applicable in connection with military aircraft operating at high altitudes, when considerable heat is required to maintain the gun mechanisms, bomb racks and like parts in proper condition and also for the windscreen de-icing systems, carburettor air-intakes and the like.

The provision of a reliable source of heat, capable of efficient operation during flight conditions, has presented many difficulties. Thus, any form of heating system must involve additional apparatus or equipment, which must be specially designed to meet such requirements as lightness in weight, standardization of design for interchangeability, fool-proof maintenance and operation; the system must also be thoroughly reliable and provide a high heat output under fighting conditions or conditions entailing operation at high altitudes at low temperatures and under conditions created by a high rate of acceleration and rapid manoeuvring.

The main object of this invention is to provide a heating system possessing a high heat output which can be maintained without fail under the foregoing conditions, and in which lightness of weight and interchangeability have been especially studied.

Other objects and advantages of the invention will hereinafter appear from the following description given with reference to the accompanying diagrammatic drawing, in which—

Fig. 1 represents the application of the improved heating system to the forward gun compartment of an aircraft.

Fig. 2 is a detail in cross section on the line 2—2 of Fig. 1.

Fig. 3 represents the heater enclosed in an outer casing which also houses two storage cylinders for air or oxygen under pressure.

Fig. 4 is a cross section on the line 4—4 of Fig. 3, and Fig. 5 is a plan view in section on the line 5—5 of Fig. 3.

Referring to Figs. 1 and 2, the gun compartment $a$ is provided with a heater $b$ housed in a casing $c$ arranged behind the compartment $a$ and within the contour of the fuselage of the aircraft or other structure; the bottom of the casing $c$ is provided centrally with an air-inlet formed by a scoop $c^1$ projecting forwardly through the lower surface of the fuselage. The heater $b$ is a catalytic flameless heater of the gasoline-platinum type, such as described in British patent specification No. 527,114. A heating duct $e$ extends from the top of the casing forwards and then downwards to a mouth $a^1$ near the bottom of the compartment $a$, which has an air-outlet provided by louvres or by a reversed scoop $a^2$ at the top of the compartment. Suitable vanes $c^2$ $c^3$ are mounted in the lower part of the casing and in the upper part thereof respectively to distribute the incoming cold air along the heater $b$, which is represented as having three wicks to supply gasoline vapour to the elements or mats in the burner head, and to deflect the heated air smoothly into the duct $e$.

The heater casing is conveniently provided with a rear door $f$ through which the heater $b$ can be inserted and removed for inspection or refilling, the heater being slidably mounted on rails $f^1$ inside the casing, as shown in Fig. 2. Through the rear door access may be had to the wick-adjusting knobs or other means for controlling the gasoline supply to the elements or mats of the burner, according to the heating required. The rails $f^1$ are connected together by a pan or tray $f^2$ which assists in the deflection of the incoming air to the sides of the casing for entry into the burner. Reflector plates or screens $f^3$ are also slidably mounted on rails in the upper part of the casing, over the burner head, so as to reflect heat through the heating elements or mats to the top of the wicks inside the burner head.

A catalytic heater such as described in the said British patent specification No. 527,114 can be made readily compact and very portable, while it possesses distinct advantages over other known types of catalytic heaters employing the same basic principles; in particular, the performance of the said heater is improved by reflection of heat emitted by the catalytic element, this heat being reflected by the overlying screens $f^3$ through the sloping elements to the top of the wicks situated thereunder to assist evaporation of the gasoline and to cause the more complete combustion of the heavier ends of the fuel in the narrow air-spaces between the elements and their screens. These characteristics enable the said heater to maintain a greater heat output at high altitudes than other types of catalytic heater. It has been found in tests under actual flight conditions and also in tests conducted in a decompression chamber, that the ordinary types of catalytic heater become extinguished through lack of oxygen at an altitude of 5,000 feet, whereas a heater of the type described in the said British patent specification No. 527,114 will normally continue to provide perfect combustion up to and including an altitude of some 15,000 feet. This effective ceiling may be considerably increased (up to 35,000 feet) by suitable control on the gasoline supply to the heater element or mat and by the provision of additional oxygen, for example by means of the air-scoop $c^1$ and the outlet at $a^2$, so as to ensure the satisfactory operation of aircraft guns even under the low temperature conditions (down to 40° C. below zero) obtaining at such high altitudes.

If desired, the heater may be supported upon gimbals within the casing $c$ so as to remain upright in the event of the aircraft flying in the upside-down position sufficiently long to affect the flow of gasoline past the wick; the gimbal frame or frames will be pivotally mounted on the rails $f^1$, and the heater or the individual heaters pivotally mounted at the front and rear ends of the frame or frames.

Figs. 3 to 5 illustrate an arrangement in which the forced air-flow is provided by means of pressure cylinders containing air or oxygen, the cylinders $g$ being enclosed in the casing $c$ at the base of the heater $b$. The supply of air or oxygen from the pressure cylinders $g$ is delivered through pipes $g^1 g^2$ to nozzles $h$ located at the normal air-inlet openings $h^1$ to the heater, the delivery being regulated at will by a suitable tap or taps $i$. If desired, the delivery may be regulated automatically by a barometrically controlled valve, located at the point $i$, the "boost" supply coming into operation at a critical altitude of say 20,000 feet in order to compensate for the decreased density of the air at that and higher altitudes, and thus providing the additional oxygen necessary to maintain perfect combustion under the conditions obtaining at such high altitudes, in spite of the abnormally high rate of gasoline evaporation due to the rarefaction of the atmosphere. The cylinders $g$ may be recharged or exchanged periodically or maintained at pressure by a compressor driven by the aircraft engine, a connection for the latter purpose being indicated at $j$.

The heater may be provided with one or more air-ducts such as $e$ for the passage of warm air rising between the catalytic elements $b^1$ and their screens $f^3$ to any desired point or points, said duct or ducts being connected integrally to the outlet of the heater casing $c$; the duct system may also be provided with air inlet means, regulated in any convenient manner, for the entry of air at normal and/or "boosted" pressure.

An advantage of this system of ducting lies in the fact that with a forced or "boosted" airflow, the warm gases may be readily swept to any desired point, even in a downward direction, without adversely affecting the rate of combustion.

What I claim is:

1. In an aircraft having a point to be heated, the combination of a catalytic heater including a sloping element and a reflector overlying said element with a narrow air-space therebetween for flameless combustion of liquid fuel, an enclosure for said heater, said enclosure having an inlet and an outlet communicating through said narrow air-space, means for forcing a flow of oxygen into said enclosure inlet for maintaining combustion in said air-space, and means for conveying the combustion gases from said enclosure outlet to the said point to be heated.

2. In an aircraft heating system, the combination of a catalytic heater including a sloping element and a reflector overlying said element with a narrow air-space therebetween for flameless combustion of liquid fuel, means operated by the motion of the aircraft for forcing oxygen through said air-space to maintain combustion therein, and a duct for conveying the heated gases of such maintained combustion from said air-space to a heater point in the aircraft.

3. In an aircraft heating system, the combination of a catalytic heater including a sloping element and a reflector overlying said element with a narrow air-space therebetween for flameless combustion of liquid fuel, a compressed oxygen storage vessel, a pipe for delivery of oxygen from said storage vessel to maintain flameless combustion in said air-space, and a duct for conveying the heated gases of such combustion from said air-space to a heater point in the aircraft.

4. In an aircraft having a compartment to be heated, the combination of a catalytic heater including a sloping element and a reflector overlying said element with a narrow air-space therebetween for flameless combustion of liquid fuel, an enclosure for said heater, said air-space being open at its lower part to the interior of said enclosure, an air-scoop projecting through an external surface of the aircraft, said air-scoop being connected to said enclosure for forcing a flow of air upwardly through said air-space to maintain flameless combustion therein, and a duct connected to the upper part of said air-space for conveying the heated gases of such maintained combustion to the compartment to be heated.

JOHN HOGG ROBERTSON.